(12) United States Patent
Lu

(10) Patent No.: US 6,768,796 B2
(45) Date of Patent: Jul. 27, 2004

(54) SYSTEM AND METHOD FOR ECHO CANCELLATION

(75) Inventor: Youhong Lu, Vernon Hills, IL (US)

(73) Assignee: 3Com Corporation, Santa Clara, CA (US)

( * ) Notice: Subject to any disclaimer, the term of this patent is extended or adjusted under 35 U.S.C. 154(b) by 549 days.

(21) Appl. No.: 09/777,115

(22) Filed: Feb. 5, 2001

(65) Prior Publication Data

US 2002/0131583 A1 Sep. 19, 2002

(51) Int. Cl.$^7$ ............................................... H04M 9/08
(52) U.S. Cl. .................................. 379/406.08; 708/322
(58) Field of Search ...................... 379/406.01, 406.08, 379/406.09; 708/322

(56) References Cited

U.S. PATENT DOCUMENTS

| | | | | |
|---|---|---|---|---|
| 5,649,012 A | * | 7/1997 | Gupta et al. ........... | 379/406.09 |
| 5,737,410 A | * | 4/1998 | Vahatalo et al. ....... | 379/406.08 |
| 5,920,548 A | * | 7/1999 | El Malki ............... | 379/406.08 |

OTHER PUBLICATIONS

International Telecommunication Union, "Digital Network Echo Cancellers", G.168, Apr. 1997, pp. i–65.

Marques et al., "Designing an Echo Canceller Using the TMS320C50OSP", Texas Instruments, Sep. 1996, pp. 1–17.

\* cited by examiner

*Primary Examiner*—Minsun Oh Harvey
*Assistant Examiner*—Jefferey Harold
(74) *Attorney, Agent, or Firm*—McDonnell Boehnen Hulbert & Berghoff

(57) ABSTRACT

Methods and systems for echo cancellation are provided. According to one method, when a far end signal with an echo having a major body and a pure delay portion is received, a filter having a finite length is provided. Once the finite length filter covers a portion of an echo path, the method includes determining whether at least a portion of the echo major body is within the filter. In one embodiment, the filter is divided into a plurality of sub-windows, and the step of determining whether the filter covers the major body of the echo path includes using filter coefficients of the first sub-window. According to one embodiment, the major body of the echo path is detected by comparing a maximum value coefficient in the first sub-window with a predetermined threshold value. If the maximum value coefficient is greater than the threshold value, the major body is detected. If the major body is not detected in the first sub-window, the filter is shifted towards the major body portion of the echo path, and the step of determining whether the filter covers the echo major body is repeated.

34 Claims, 10 Drawing Sheets

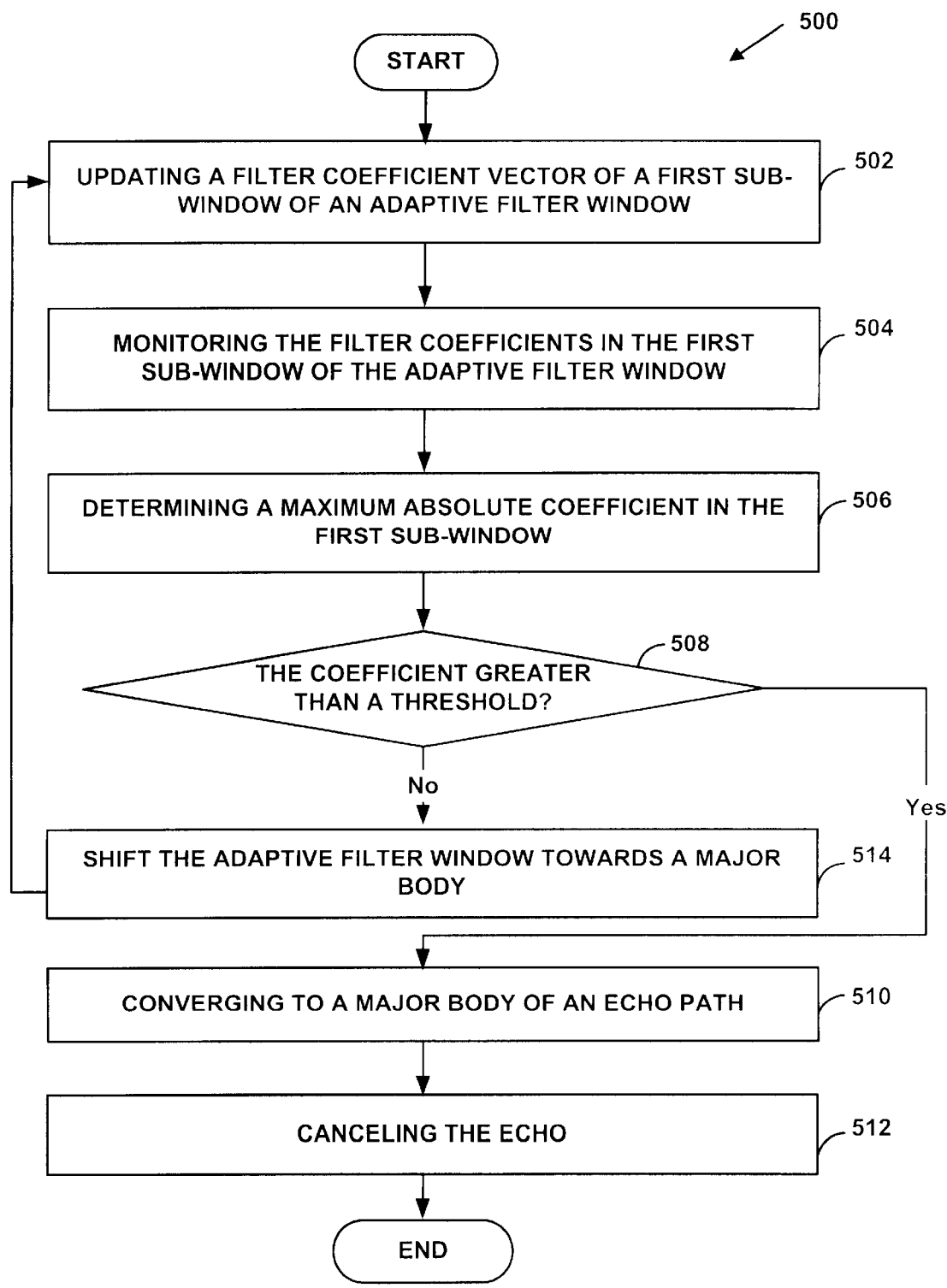

SYSTEM AND METHOD FOR ECHO CANCELLATION

FIELD OF INVENTION

The present invention relates to communications networks. More specifically, it relates to a method and system for delay detection and echo cancellation.

BACKGROUND OF THE INVENTION

The central offices of Public Switched Telephone Networks employ network hybrids to interface analog subscribers to the local exchange. Typically, a 2-wire full-duplex line connects the subscriber to the central office while the network hybrid provides an interface to the two 2-wire simplex digital transmission network. In this way, data are transmitted to and received from other subscribers who are connected via a 2-wire line to the digital transmission network by another hybrid at the local exchange.

As is known in the art, echo cancellation is often discussed with reference to speech signal communication between a "near end" and a"far end" and vice versa. A person speaking at the "far end" of a telephone connection has her speech sent over the digital transmission network to a person listening (and eventually speaking) at the "near end." A portion of the speech signal that is transmitted from the far end speaker "echoes" off of the network hybrid that is farther away from the far end speaker and closer to the person located at the near end (the near end speaker). In this way, the "near end" hybrid creates an unwanted signal echo of the transmitted far end speech signal and sends it back toward the far end, only to be heard by the far end speaker as an annoying echo of her own voice.

As is known in the art, network echo canceller circuitry is located at both network hybrids (one at the "far end," and one at the "near end"). In the case of far end speaker echo, that is, the echo of a transmitted far end speech signal back to the near end, a network echo canceller at the near end network hybrid (the hybrid closest to the near end speaker) is used to cancel the echo. The echo canceller at the near end generates a local replica of the echo generated by the far end signal as it passes through an echo path, or echo channel at the near end. This local replica of the echo is generated and used by the echo canceller to attempt to cancel the echo before it returns to the far end speaker. The echo path or channel is the entire path traveled by the transmitted far end signal as it leaves the echo canceller, as a portion of it echoes off of the near end hybrid, and as its echo returns back to the echo canceller. In particular, the echo path represents the outgoing and incoming digital transmission lines as well as the near end network hybrid (the one closest to the near end speaker, and distant from the far end speaker).

Similarly, in the case of echo from the near end speaker, that is, the echo of a transmitted near end speech signal back to the near end, a network echo canceller at the far end network hybrid (the hybrid closest to the far end speaker) cancels the echo that is generated from a portion of the near end speech signal echoing off of the opposite hybrid (the far end hybrid) and that returns toward the network hybrid closest to the near end (the near end hybrid).

A typical network echo canceller employs an adaptive digital transversal filter to model the impulse response of the unknown echo channel so that the echo signal can be cancelled. The echo impulse response coefficients used in the transversal filter are updated to track the characteristics of the unknown echo channel. For reference purposes, network echo cancellers are examined from the point of view of the far end speaker, that is, these cancellers act to minimize far end echo.

Connections over the digital transmission network vary in terms of the distance traveled by the signals from near end to far end and vice versa. For example, relative to a far end speaker initiating a telephone call over the digital transmission network, the distant hybrid (at the near end) may be located anywhere from thirty-five or forty miles to thousands of miles away from the closer hybrid (at the far end). The speech signal sent by the far end speaker will encounter a "round trip" or "flat" delay in its path from the closer hybrid to the distant hybrid and back again as echo to the closer hybrid. Thus, the magnitude and duration of the flat or round trip delay is dependent on the distance traveled by the signals on a particular telephone call, with each telephone connection experiencing a different flat delay.

An additional issue is that the magnitude of duration of the flat delay may change during a single telephone call, especially in Voice over Internet Protocol ("VoIP") applications and wireless systems. The existing echo cancellation systems employ different methods to detect the pure delay and to cancel the echo path. Further, the existing systems use an adaptive filter algorithm to model the entire echo channel characteristics including the trip delay portion ("flat" delay portion) of the entire echo path delay. Thus, using the existing methods, the echo cancellation performance such as a convergence rate is not efficient. Further, such methods are not cost efficient since memory usage and required computer speed are high.

Therefore, needed is a computationally efficient and easily implemented technique for an echo cancellation employing an adaptive digital filtering to cancel far end echo.

SUMMARY OF THE INVENTION

In accordance with preferred embodiments of the present invention, some of the problems associated with performing echo cancellation are addressed.

A method for canceling echo channel characteristics is developed. In one embodiment, the method includes receiving a far end signal with an echo, where an echo path has a major body portion and a pure delay portion. Once the far end signal with the echo is received, a filter having a finite length is applied to a portion of the echo path. In one embodiment, the length of the filter is substantially equal to a length of the major body of the echo path. Further, the method includes determining whether at least a portion of the major body is within the filter. In one embodiment, the filter includes a plurality of sub-windows, and the step of determining whether the portion of the major body is within the filter includes determining whether the portion of the echo major body is within a first sub-window of the filter.

According to an exemplary embodiment, the step of determining whether the portion of the echo major body is within the first sub-window includes: analyzing a filter coefficient vector associated with the first sub-window, determining a maximum absolute coefficient value in the first sub-window, and determining whether the maximum absolute coefficient value is greater than a threshold level. Further, the method includes shifting the filter if at least a portion of the major body of the echo path is not within the first sub-window. If the portion of the major body is within the first sub-window, the method includes canceling echo characteristics using a filter coefficient vector associated with the filter window.

The foregoing and other features and advantages of preferred embodiments of the present invention will be more readily apparent from the following detailed description, which proceeds with references to the accompanying drawings.

BRIEF DESCRIPTION OF THE DRAWINGS

Exemplary embodiments of the present invention are described with reference to the following drawings, wherein:

FIG. 10 is a flow chart illustrating an exemplary method for canceling an echo according to an exemplary embodiment.

DETAILED DESCRIPTION OF PREFERRED EMBODIMENTS

The central offices of Public Switched Telephone Networks employ network hybrids to interface analog subscribers to the local exchange. Typically, a 2-wire full-duplex line connects the subscriber to the central office while the network hybrid provides a link to the two 2-wire simplex digital transmission network. In this way, data are transmitted to and received from other subscribers who are connected via a 2-wire line to the digital transmission network by another hybrid at the local exchange.

Figure 1:
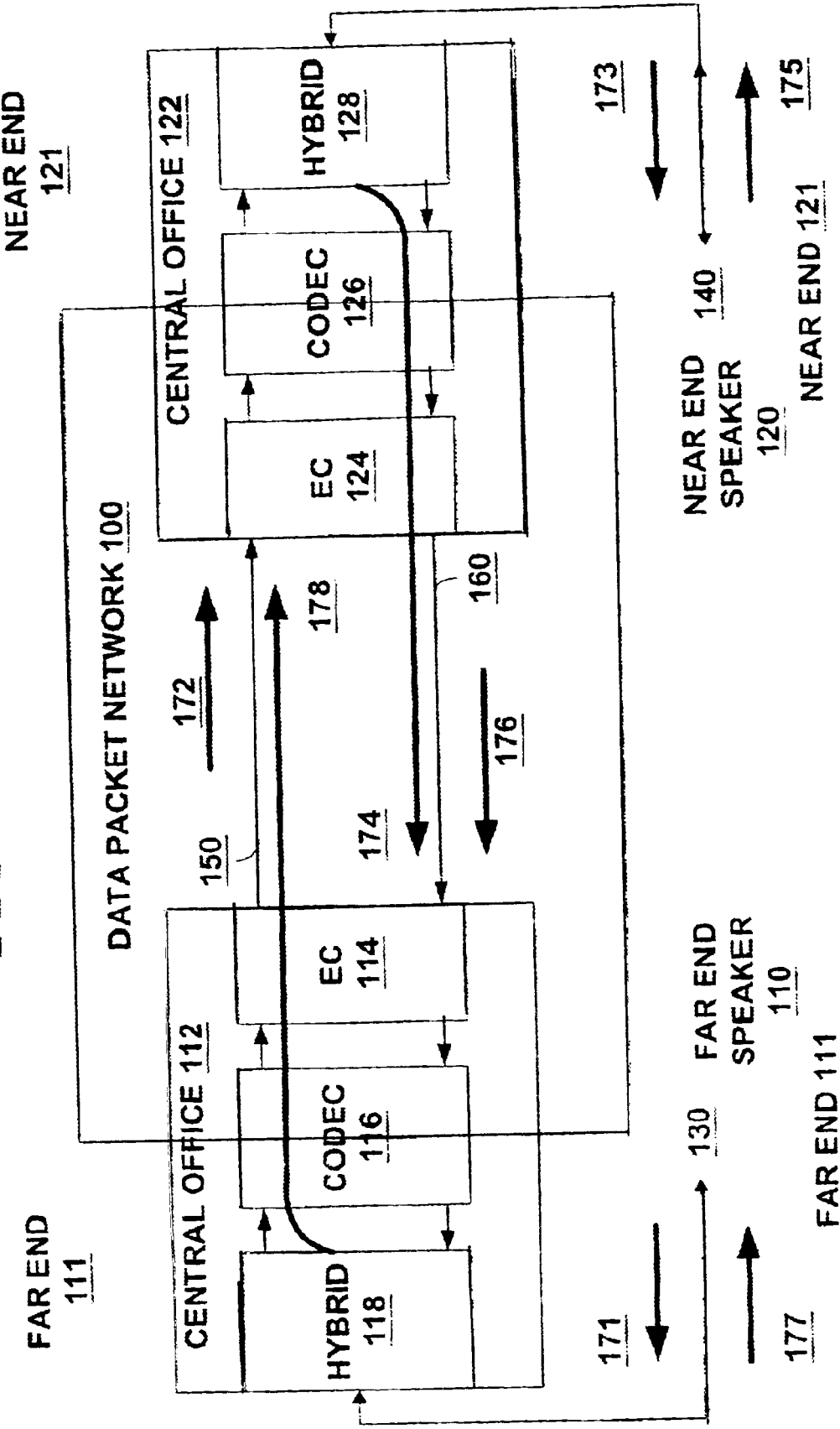
FIG. 1 is a block diagram illustrating communication over an exemplary digital transmission network between a far end speaker and a near end speaker.

FIG. 1 is a block diagram illustrating communication over an exemplary digital transmission network or Data Packet Network ("DPN") 100 between a person speaking at the "far end" 111 of a telephone connection and a speaker at the "near end" 121 (for example). Telephone company Central Offices 112, 122 include, among other items not shown in FIG. 1, network Echo Cancellers ("ECs") 114, 124; Codecs 116, 126; and Hybrids 118, 128, respectively. A Far End Speaker 110, communicating with a Near End Speaker 120, transmits an analog speech signal 171 along a far end 2-wire full duplex line 130 to the Central Office 112. The Hybrid 118 at the Central Office 112 closest to the far end 111 interfaces the 2-wire line 130 with a pair of 2-wire simplex lines, 150 (outgoing from the far end 111) and 160 (incoming to the far end 111). The analog speech signal 171 is converted to a digital signal 172 by the Codec 116 also located at the far end Central Office 112. The far end side of the DPN 100 can be defined as the point at which the analog signal 171 is converted to the digital signal 172. The digital signal 172 is received by the EC 114 before exiting the Central Office 112.

The digital signal 172 travels along the 2-wire simplex line 150 through the DPN 100 to the Central Office 122 nearest to the near end. The digital signal 172, after passing through the EC 124, is converted to an analog signal 173 by the Codec 126 located at the Central Office 122. The near end side of the DPN 100 can be defined as the point at which the digital signal 172 is converted to the analog signal 173. The analog signal 173 sent by the Far End Speaker 110 exits the Central Office 122 and travels toward the near end 121 and the Near End Speaker 120 along a 2-wire fill duplex line 140.

The network Hybrid 128 that is farthest away from the far end 111 and closest to the near end 121 will create an echo (shown as signal arrow 174 in FIG. 1) of the signal 172 (171) transmitted from the Far End Speaker 110. In this example, this unwanted echo signal 174 is transmitted back across the DPN 100 along a 2-wire simplex line 160 to the far end 111 so that the Far End Speaker 110 hears an annoying echo of her own speech.

As is known in the art, network echo canceller circuitry (EC 114, 124) is located at both Central Offices 112, 122. To cancel the echo signal 174 from the Far End Speaker 110, that is, to cancel the unwanted echo 174 of the transmitted far end speech 172 (171) back toward the far end 111, the EC 124 is located at the Central Office 122 closest to the Near End Speaker 120, as is typically the case. The EC 124 provides and adaptively generates a local replica (not shown in FIG. 1) of the echo signal 174 by modeling the impulse response of the echo path. The echo path or echo channel presented to the far end signal 172 and its far end echo 174 include the outgoing and incoming digital transmission lines (between the EC 124 and the CODEC 128) and the network Hybrid 122 located closest to the near end 121. The local replica of the echo is used by the EC 124 at the near end Central Office 122 to attempt to cancel the echo before it returns to the Far End Speaker 110.

The echo cancellation process for speech transmitted from the near end 121 proceeds in a similar fashion, but from an opposing perspective. The Near End Speaker 120 transmits an analog speech signal 175 to the Central Office 122. The analog signal 175 passes through Hybrid 128 and is converted to a digital signal 176 by the Codec 126. The digital signal 176 is received into the EC 124 prior to exiting the near end Central Office 122 and traveling along the line 160 to the far end 111. The digital signal 176 is ultimately converted to an analog signal 177 by the Codec 116 at the far end Central Office 112 and is sent to the far end along line 130. A portion, however, of the transmitted near end speech signal 176 (175) echoes off of the network Hybrid 118 closest to the far end 111 as echo signal 178, and returns toward the near end Central Office 122. The EC 114 located at the far end Central Office 112 closest to the Far End Speaker 110 cancels the echo signal 178 that is generated from the speech signal 176 (175) that is transmitted from the near end.

As regards the pair of signals 172, 178 traveling on the 2-wire simplex line 150 and the pair of signals 176, 174 traveling on the 2-wire simplex line 160, it should be understood that the signals within each combined pair were discussed in isolation from each other for clarity of explanation. For example, the signals 172 and 178 are components of the same signal.

For reference purposes and as is known in the art, network echo cancellers can be examined from the point of view of the Near End Speaker 120. That is, an echo canceller minimizes the far end echo so that the Far End Speaker 110 does not hear a noticeable echo of her own voice. Of course, the reverse proposition is true, and the canceller on the opposite end can be examined from the point of view of the Far End Speaker 110, as is evident from the discussion of FIG. 1.

Figure 2:
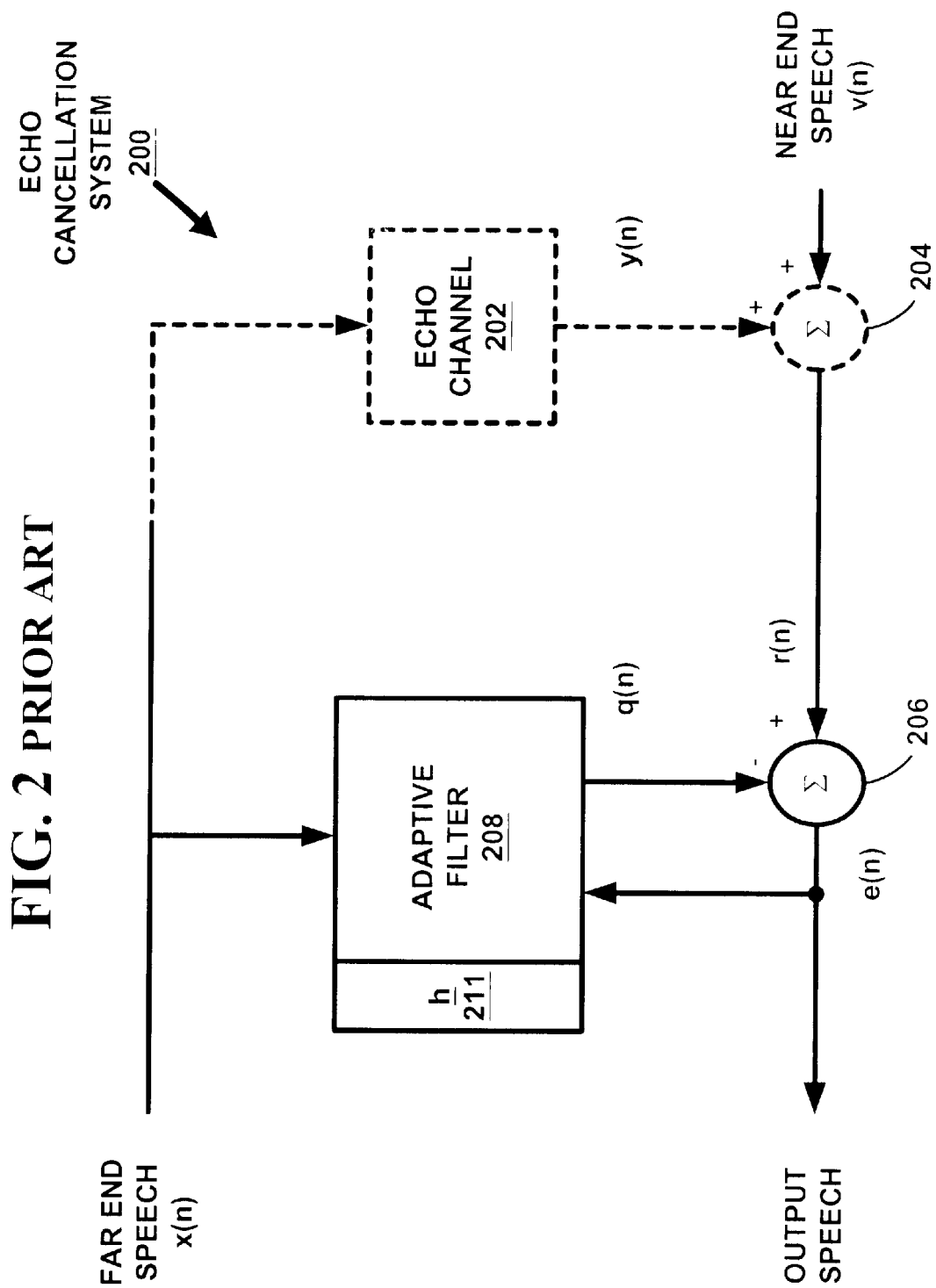
FIG. 2 is a block diagram illustrating an exemplary echo cancellation system.

FIG. 2 is a block diagram illustrating an exemplary echo cancellation system 200. It should be understood that the echo cancellation system 200 of FIG. 2 is analogous to the EC 124 of FIG. 1, with the exception of the dotted lines and elements, and can be viewed instructively with reference to FIG. 1. All signals discussed with reference to FIG. 2 are sampled signals of the form (for example) "a(n)". Although a signal is referred to as the "signal a(n)," it should be understood that "a(n)" can also represent the current sample value of the signal a(n) at an instant n, and that the signal a(n) under discussion may include, for example, a plurality of samples occurring prior to a(n), (i.e. a(n−1), a(n−4), etc.).

An incoming far end speech signal x(n) (analogous to signal 172 in FIG. 1) enters an unknown Echo Channel 202 that is intended to model the entire echo path of the far end speech signal (see signals 172, 174 in FIG. 1). A far end echo signal y(n) (see 174 in FIG. 1) is "generated" from x(n) by the unknown Echo Channel 202 and is output by the Echo Channel 202. The unknown Echo Channel 202 is not an actual functional block; rather it is a model of the echo phenomenon. The far end echo created by the near end network hybrid (see Hybrid 128 in FIG. 1) and the Echo Channel 202 do exist, yet the characteristic response of the echo channel and the values of the far end echo are not known a priori and must be estimated in order for echo cancellation to be effective.

An incoming near end speech signal v(n) (see 176 in FIG. 1) is summed with the far end echo signal y(n) at a Summer 204 to produce a signal r(n) (signal 174 plus signal 176). A high-pass filter (not shown) might follow the Summer 204 to remove low-frequency signal components and background noise present in the signal r(n), i.e. the sum of y(n) and v(n). The Summer 204 is not an actual physically implemented summer; rather, it models the combination of the far end signal echo with the near end speech. Generally, unless both the Far End Speaker 110 and the Near End Speaker 120 of FIG. 1 are talking at the same time (doubletalk), only one of y(n) or v(n) will be present and/or significant relative to the other. The echo cancellation system 200 cancels the echo y(n) out of the signal r(n) so that the Far End Speaker 110 of FIG. 1 does not hear an echo of her own voice. The near end speech signal v(n) component of the signal r(n) is at worst an impediment to and is at best not advantageous to this end, the cancellation of the far end echo y(n).

An Adaptive Filter 208 having an impulse response coefficient vector $\underline{h}$ 211 generates a local replica q(n) of the far end speaker echo y(n) to cancel the echo y(n) through the unknown echo channel 202 of FIG. 2. The Adaptive Filter 208 outputs the local replica of the echo y(n), the echo estimate signal q(n). The echo estimate signal q(n) is subtracted from the signal r(n) at a subtract input of a Summer 206 to yield an echo residual signal e(n). The echo residual signal e(n) is the output speech of the echo canceller or echo cancellation system 200. A filter, attenuator, or other nonlinear frequency component shaping system block (not shown) may be used to adjust, attenuate or clip the echo residual signal e(n) as desired. That is, the local replica q(n) generated by the Adaptive Filter 208 might not cancel the far end echo signal y(n) in the signal r(n) completely, requiring some adjustment to the echo residual signal e(n).

Figure 3:
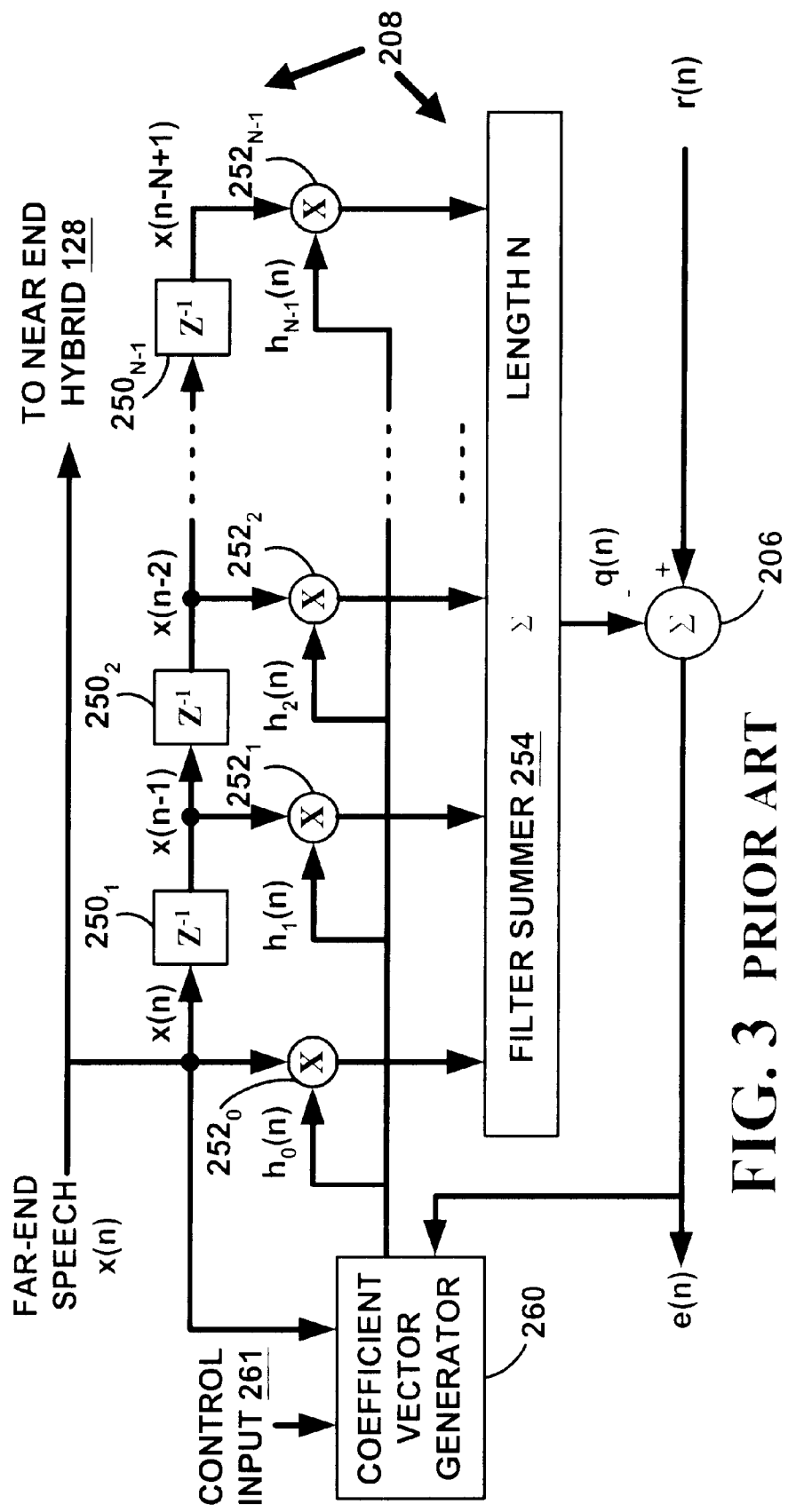
FIG. 3 is a block diagram illustrating an exemplary adaptive transversal filter for use in the echo cancellation system of FIG. 2.

FIG. 3 is a block diagram illustrating an exemplary adaptive transversal filter for use in the echo cancellation system 200 of FIG. 2. In particular, the adaptive transversal filter is an implementation of the Adaptive Filter 208 of FIG. 2. The samples of the far end speech signal x(n) heading toward the near end Hybrid 128 are received into a delay line of N−1 block delay elements 250 so that a series of delayed samples of the signal x(n) are presented to the adaptive transversal filter.

A Coefficient Vector Generator ("CVG") 260 in FIG. 3 updates a vector $\underline{h}$ (analogous to vector $\underline{h}$ 211 of FIG. 2) of echo impulse response coefficients or transversal filter taps according to an algorithm or scheme that extracts information about the unknown echo channel 202 of FIG. 2 from the sampled signals x(n) and e(n), for example. The coefficients of vector $\underline{h}$ 211 are progressively updated in order to track the characteristics of the unknown echo channel 202 of FIG. 3. As is familiar to those in the art, a Least-Mean Square adaptation algorithm or method is typically used to update the echo impulse response coefficient vector $\underline{h}$ 211.

As described above, the Adaptive Filter 208 shown in FIG. 2 (and implemented in FIG. 3) outputs and generates the echo estimate signal q(n) of the far end speaker echo y(n) to cancel the echo y(n) through the unknown echo channel 202 of FIG. 2. The samples of the far end signal vector $\underline{x}(n)$ and the coefficients of the coefficient vector $\underline{h}(n)$ 211 are multiplied together in a set of N Multipliers 252 and summed together in a Filter Summer 254 of length N as shown in FIG. 3 to arrive at the echo estimate signal q(n). The echo estimate signal q(n) is subtracted from the signal r(n) at a subtract input of the Summer 206 to yield an echo residual signal e(n), as shown in FIGS. 2 and 3.

Referring to FIGS. 2 and 3, for each new sample x(n) of the far end speech signal x(n), the previous samples of the signal x(n) are shifted through the delay line (or buffer, if applicable). The filter coefficient vector 211 is updated (if near end speech is not indicated, for example) typically according to an algorithm. Finally, a new value of the echo estimate signal q(n) is created to cancel the far end echo y(n) component of the signal r(n) and is subtracted from r(n) at Summer 206 to yield the new value of the echo residual signal, e(n).

Although a delay line of block delay elements 250 is shown in FIG. 3, other implementations for receiving the far end signal x(n) are used, including providing a series of samples longer than the length N of the transversal filter into a buffer (not shown in FIG. 2 or 3). The buffer (not shown) may or may not be a separate element from the adaptive transversal filter of FIG. 3 or the Adaptive Filter of FIG. 2. A buffer implemented to receive samples of the far end signal x(n) typically will be at least as long as the adaptive filter length N.

Connections over the digital transmission networks or DPN 100 of FIG. 1 vary in terms of the distance traveled by the signals from the near end 121 to the far end 111 or vice versa. For example, relative to the Far End Speaker 110 initiating a telephone call to the Near End Speaker 120 over the DPN 100, the distant Hybrid (near end Hybrid 128) may be located anywhere from thirty-five or forty miles to thousands of miles away from the closer hybrid (far end Hybrid 118). The far end speech signal x(n) (signal 171 of FIG. 1) sent by the far end Speaker 110 will encounter a round trip or "flat" delay in its path from the closer far Hybrid 118 to the distant near end Hybrid 128 and back again as echo (the y(n) component of r(n); the signal 174) to the closer far end Hybrid 118. Thus, the magnitude and duration of the flat or round trip delay is dependent on the distance traveled by the signals on a particular telephone call, with each telephone connection experiencing a different flat delay. An additional issue is that the magnitude or duration of the flat delay may change during a single telephone call.

Figure 4:
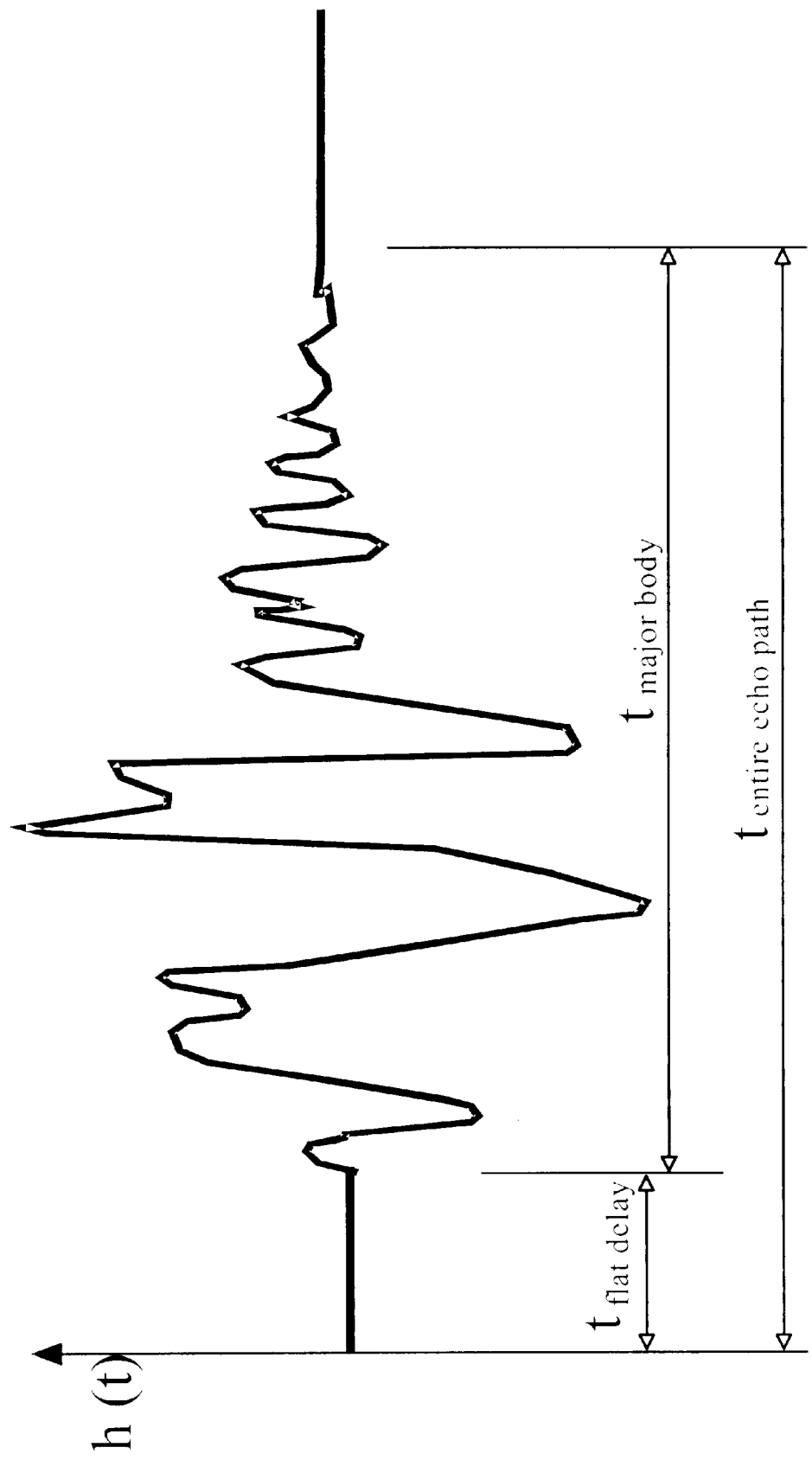
FIG. 4 is an illustration of timing diagrams of echo path characteristics.

FIG. 4 is an exemplary impulse response characteristics h(t) of an echo channel spanning the entire echo path delay time. The echo channel impulse response characteristics h(t) for the entire delay time is shown to have two regions familiar to those in the art, a flat delay region and an echo dispersion region. The flat delay region denotes the flat region of the impulse response, where the impulse response is substantially zero. The duration of the flat delay time (also referred to as the trip delay time) is measured in terms of a time $t_{flat\ delay}$ as shown in FIG. 4. The echo dispersion region includes the active portion, herein after referred to as a major body, where the impulse response has a relatively significant absolute magnitude, i.e. where an echo of the far end signal is created. The duration of the major body is measured in terms of a time $t_{major\ body}$ as shown in FIG. 4. For example, transmission lines could cause the flat delay in the impulse response shown in FIG. 4, and a hybrid such as the hybrid 118 could cause the major body response.

Figure 5:
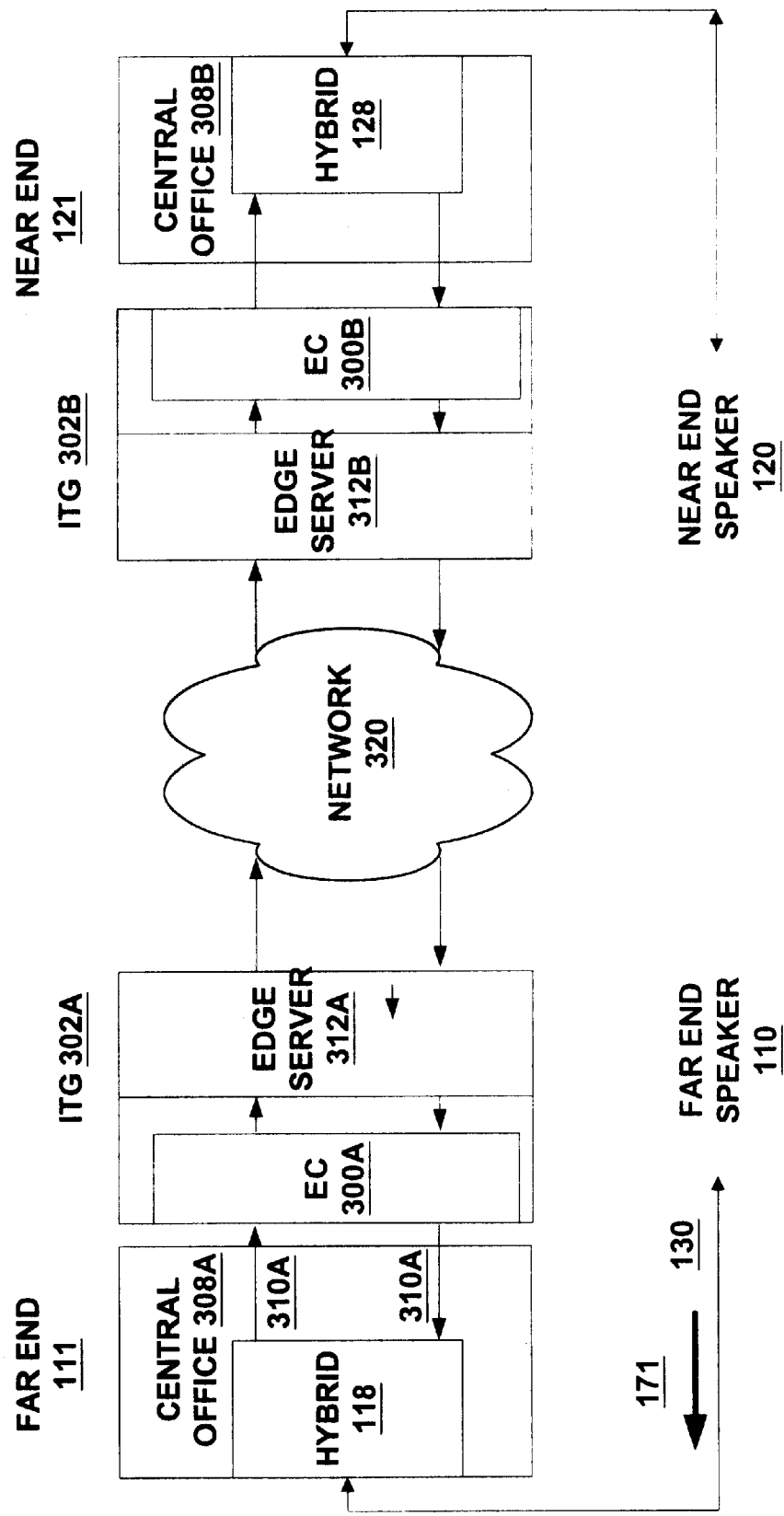
FIG. 5 is a block diagram illustrating communication over an exemplary VoIP system between a far end speaker and a near end speaker.

The flat delay shown in FIG. 4 is relatively short comparing to flat delays that are typically observed in VoIP applications, where an EC is typically embedded in an Internet Telephony Gateway ("ITG"). FIG. 5 is a diagram illustrating an exemplary communication between a person speaking at the far end 110 and a person speaking at the near end 120, where the person at the far end and the near end use a centralized packet switched connection. As shown in FIG. 5, the far end speaker 110, communicating with the near end speaker 120, transmits an analog speech signal along the far end 2-wire fall duplex line 130 to the Hybrid 118 that is part of a Central Office such as a CO 308A. The Hybrid 118 is connected via transmission lines 310A to an Internet Telephony Gateway ("ITG") 302A. As known in the art, a gateway takes a telephone signal, digitizes it, compresses it, packetizes it for a packet switched network 320 such as an Internet using Internet Protocol (IP), and routes it to a destination over the packet switched network 320. Since signals received from telecommunication networks contain not only useful signals, but also the echo reflected by the network component hybrid 118, the ITG 302A contains an echo canceller 300A to cancel the echo and, thus, enhance speech quality. The ITG 302A includes, among other items not shown in FIG. 5, an edge server 312A.

The principle behind the system shown in FIG. 5 is similar to Internet Telephony desktop applications, but rather than using a microphone and speakers connected to PCs, a user such as the far end speaker 110, speaks into a telephone connected to the CO 308A. To place a call, the far end user dials a number of another party such as a number of the near end speaker 120. The CO 308A routes the call through the ITG 302A, and the ITG 302A contact an ITG 302B on the other side of the packet switched network 320. The process would be reversed to the near end speaker 120, where the near end includes the components described in reference to the far end side. However, the system shown in FIG. 5 is not limited to the shown components, and fewer, more, different or equivalent components could also be used. Further, the exemplary embodiment is not limited to having telephones on the end sides. In one embodiment, the far end side could include a PC having a direct connection to the packet switched network 320, and the near end user could have a telephone connected via the CO 302B and the ITG 302B to the packet switched network 320, for example. Other embodiments are possible as well.

Figure 6:
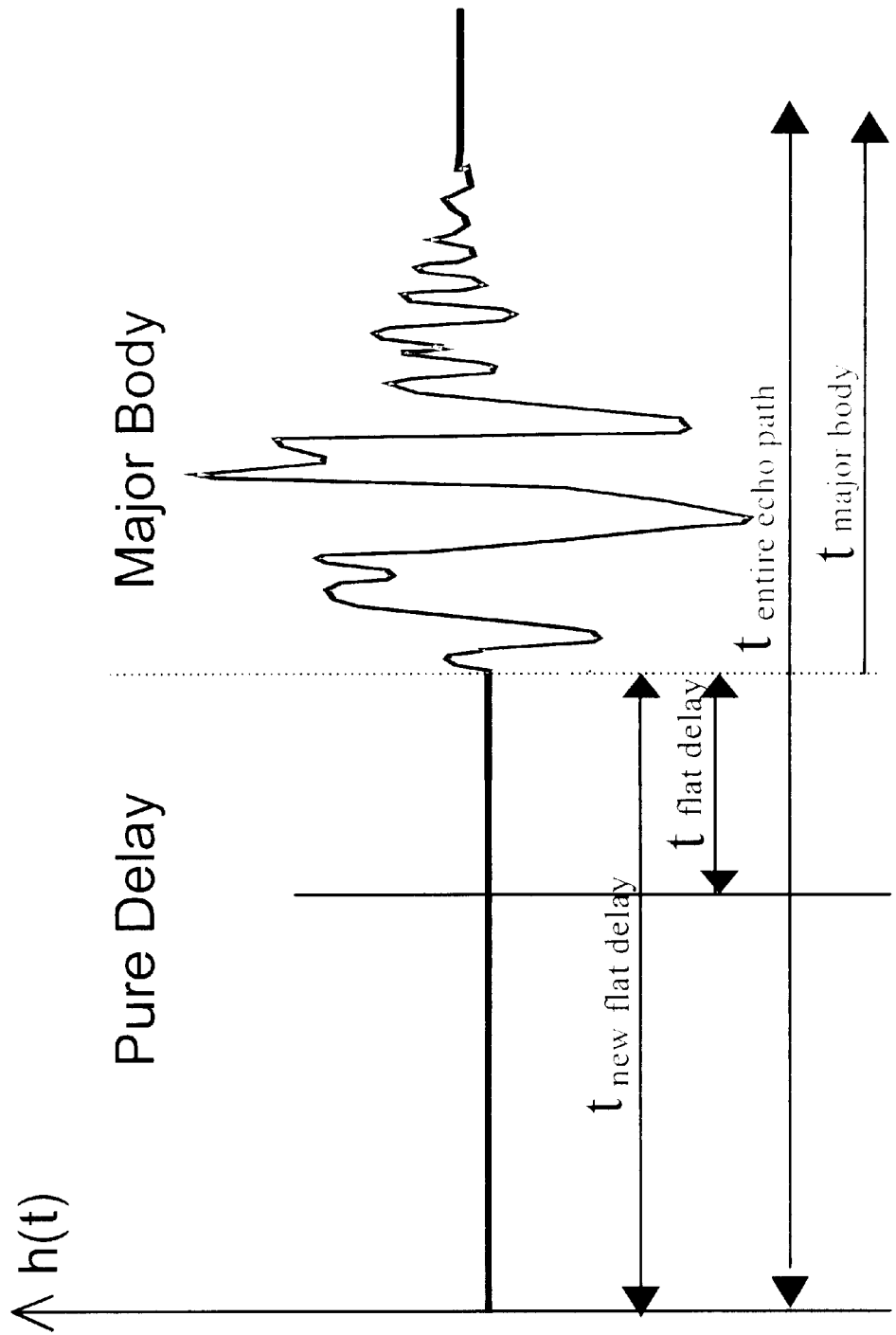
FIG. 6 is an illustration of timing diagrams of echo path characteristics in VoIP systems.

In the VoIP systems such as the system shown in FIG. 5, where an Echo Canceller is a component of an ITG, a pure delay associated with an entire echo path is typically longer than a pure delay of a hybrid. The reason for longer pure delays in VoIP applications is that transmission lines that connect an ITG with different hybrids may have different lengths for different calls. Thus, signals received by hybrids from an ITG are delayed signals with varying delays. Similarly, signals received by the ITG from the hybrids are delayed signals from hybrids with varying delays for different calls. FIG. 6 shows an exemplary impulse response characteristics h(t) of an echo channel spanning the entire echo path delay time in a VoIP system compared to the impulse response characteristics shown in FIG. 4. The echo channel impulse response characteristics h(t) in FIG. 6 for an entire echo path is shown to have two regions, a flat delay region and an echo dispersion region. However, compared to the impulse response shown in FIG. 4, the delay region shown in FIG. 6 ("new flat delay") is longer than the delay region shown in FIG. 4. Further, according to one embodiment, the pure delay region varies depending on a transmission line length associated with a particular signal.

Figure 7:
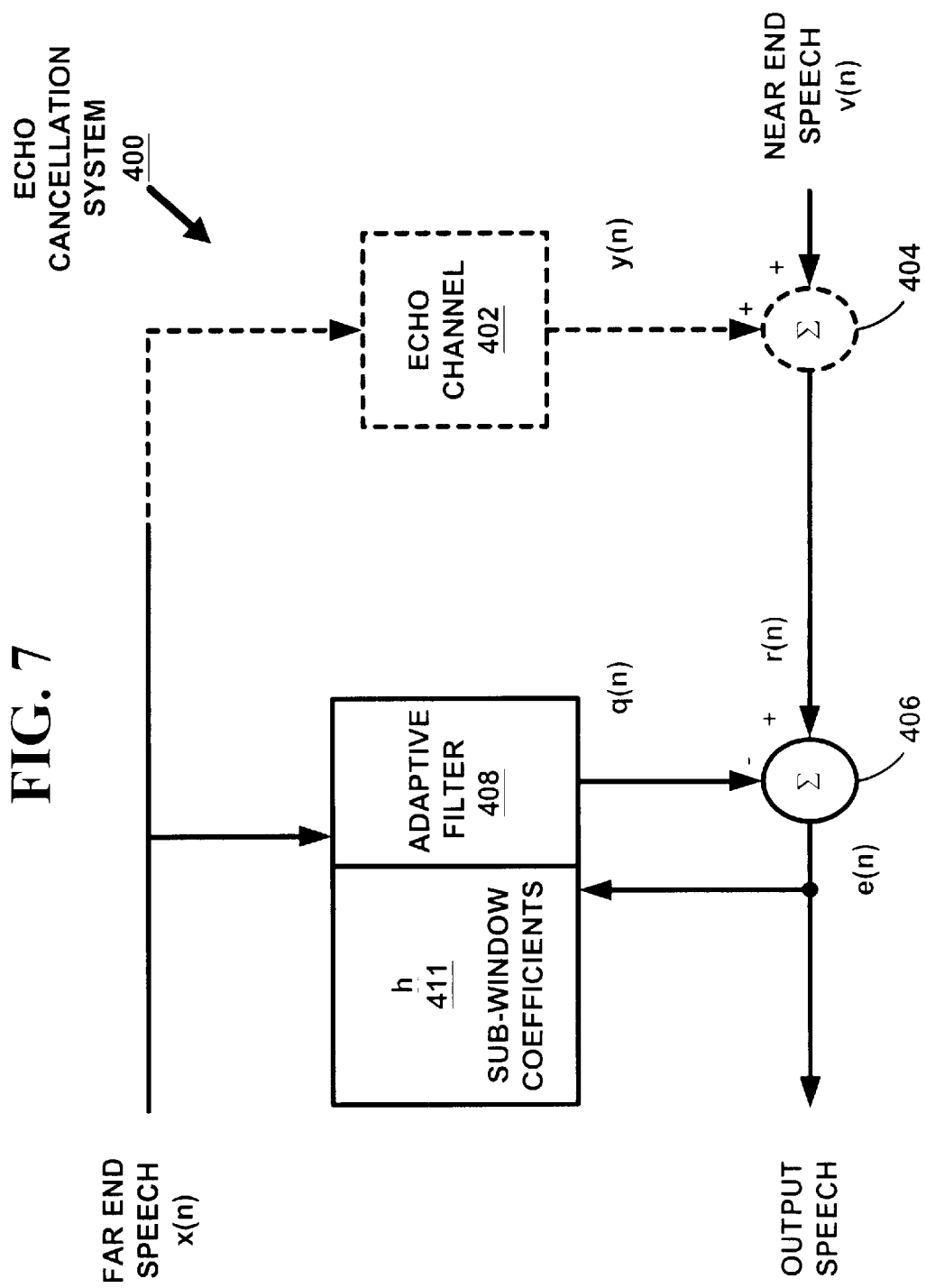
FIG. 7 is a block diagram illustrating an echo cancellation system according to an exemplary embodiment.

FIG. 7 is a block diagram illustrating an echo cancellation system or an echo canceller 400, according to an exemplary embodiment. A far end speech x(n) passes through an unknown echo channel 402, thus, creating a far end echo signal y(n) that is combined with a near end speech signal v(n) at summer 404 to form a signal r(n). An adaptive filter 408 generates and updates filter tap coefficients vector 408 to model the characteristic impulse response of the echo channel 402 so that the far end speech signal x(n) can be adaptively filtered to create a local replica of the far end echo, or an echo estimate signal q(n). Further, the filter 408 has a finite length and, in one embodiment, the length of the filter 408 is substantially equal to a length of a major body of an echo path, and the filter can be viewed as an adaptive filter window. According to an exemplary embodiment, the adaptive filter window is divided into a plurality of sub-windows having substantially equal lengths. In one embodiment, the filter window could be divided into four sub-windows, where each sub-window has a length of M and, thus, L=4M. The adaptive filter 408 is progressively updated in order to track the characteristics of the unknown echo channel. According to an exemplary embodiment, the vector h 411 impulse response includes a plurality of coefficients or tap values and, in one embodiment, it includes impulse response coefficient associated with a first sub-window of the adaptive filter window.

Figure 8:
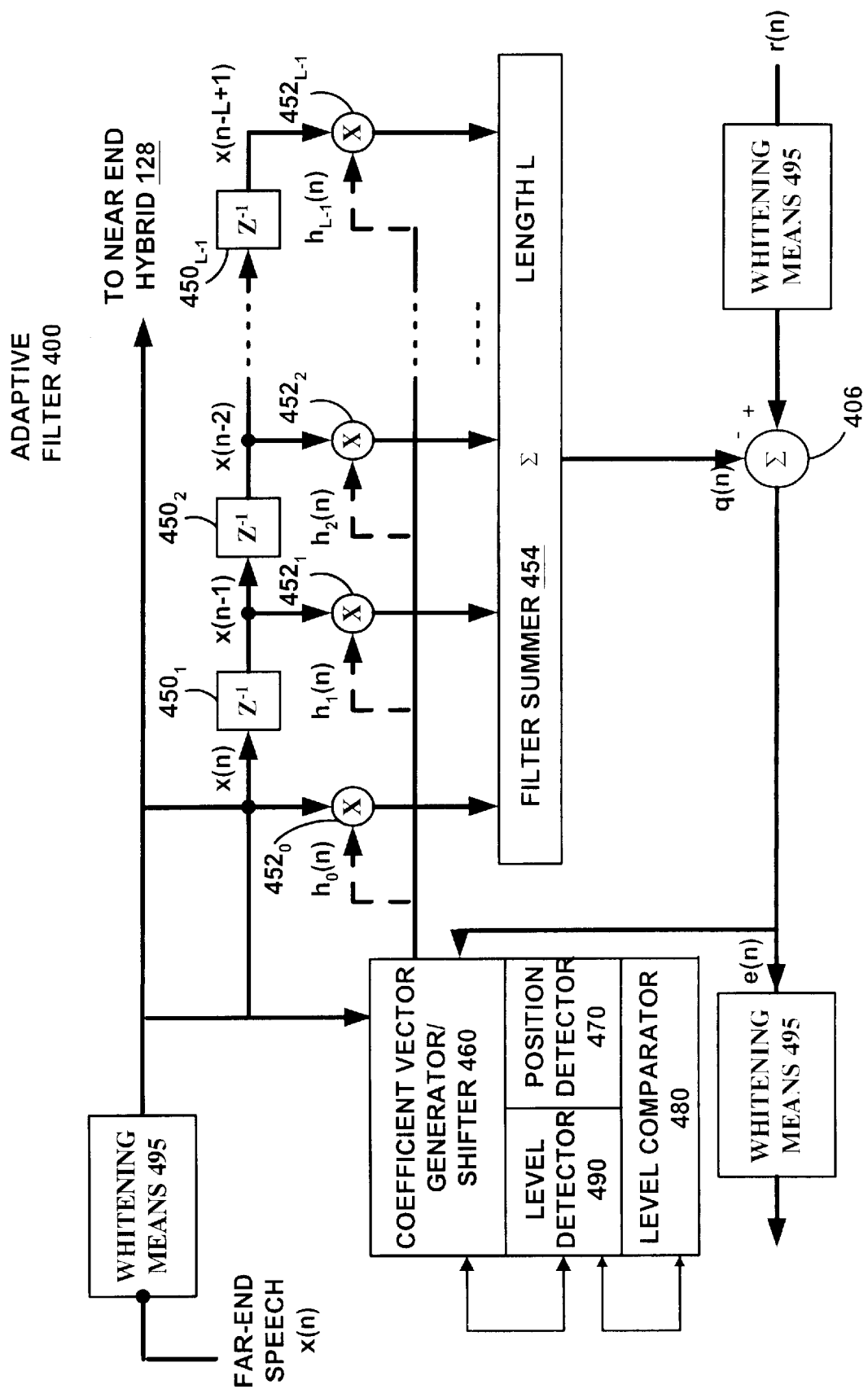
FIG. 8 is a block diagram illustrating an exemplary adaptive filter for use in the echo cancellation system of FIG. 7.

FIG. 8 illustrates an exemplary block diagram of an adaptive filter that can be used to implement the adaptive filter 408 of the echo cancellation system 400 shown in FIG. 7. The adaptive filter 408 includes a delay line of L−1 delay elements 450, a coefficient vector generator ("CVG") 460, a set of L multipliers 452, a filter summer 454 having length L, a position controller 470, a level detector 490, and a level comparator 480. The adaptive filter shown in FIG. 8 has a length substantially equal to a major body length of an echo path, and it is divided into four sub-windows. According to an exemplary embodiment, the length of the filter 400 is L, and the length of each sub-window is M. However, the exemplary embodiment is not limited to a filter having a length of the major body of the echo path and, further, having four sub-windows, and other embodiments are possible as well. For example, the filter could be divided into a smaller or larger number of sub-windows. Moreover, the sub-windows may be of different lengths.

As shown in FIG. 8, the filter summer 454 having the length of the adaptive filter 400 is connected to the CVG/shifter 460. According to an exemplary embodiment, only a predetermined number of the filter coefficients is used for the analysis of the echo path. In one embodiment, coefficients associated with a first sub-window are used for the analysis of the filter path. Further, according to an exemplary embodiment, the adaptive filter 400 includes a level detector 490 for determining a maximum coefficient in a first sub-window of the adaptive filter 400. In one embodiment, to determine the maximum coefficient, the level detector may compute absolute value of the filter coefficients or square the filter coefficient. For example, the level detector may first determine absolute values of the first two coefficients in the first sub-window and may create a record for storing an index and a maximum value associated with a coefficient having the maximum value. In such an embodiment, the level detector may repeat the process for the rest of the coefficients, where the level detector may compute an absolute value of each subsequent coefficient and, if an absolute value of any subsequent coefficient is greater than the stored value, the level detector may update the maximum coefficient value in the record as well as the index associated with that coefficient. However, the exemplary embodiments are not limited to such maximum coefficient detection scheme, and other methods could be used for detecting the maximum coefficient. Further, the adaptive filter 400 includes the position detector 470 for detecting a position of the maximum absolute coefficient in the first sub-window. In one embodiment, the position of the maximum absolute coefficient is determined by first determining a sequence of indices of all coefficients in the first sub-window and, then, determining an index of the maximum absolute value coefficient. However, the present invention is not limited to detecting the maximum absolute coefficient in the first sub-window in order to detect the major body of the echo path, and other existing or later developed methods could also be used.

Further, according to an exemplary embodiment, the filter 400 includes a level comparator 480 that compares the maximum absolute coefficient value (in dB, for example) with a predetermined threshold level (in dB, for example). As known in the art, major peak values in a major body of an echo path relate to an echo return loss ("ERL"), and the ERL represents the attenuation of the input signal by a hybrid, for example. In one embodiment, the predetermined threshold level is a sum of the ERL and a predetermined constant. For example, a value of the ERL could be greater or equal to 6 dB, and a value of the predetermined constant could be 6 dB. However, other values could also be used. In one embodiment, if the maximum absolute coefficient value is lower than or equal to the predetermined threshold level, the filter 400 is shifted toward the echo major body. In one embodiment, the filter coefficients could be stored in a memory unit, and when the echo major body is not detected the coefficients could simply be shifted. Thus, when the major body is not detected, some of the filter taps may be disabled and the coefficients associated with the first sub-window are simply shifted. FIG. 8 illustrates disabling/enabling of the filter taps by dashed lines. In an exemplary embodiment, the filter 400 is shifted one sub-window length toward the echo major body. If the absolute filter coefficient value is greater than the predetermined threshold level, the major body is detected, the filter 400 converges, and the echo is cancelled. Further, according to an exemplary embodiment, the adaptive filter 400 includes whitening means 495 such as a whitening filter that causes frequency domain spectrums of the x(n) signal and r(n) signal to have flat frequency characteristics. In one embodiment, a Linear Prediction Coefficient Analysis algorithm could be used as whitening means 495; however, different algorithms could also be used. Further, the whitening means 495 may be applied to the e(n) signal as post-whitening means in order to recover initial properties of the signal.

Figure 9A:
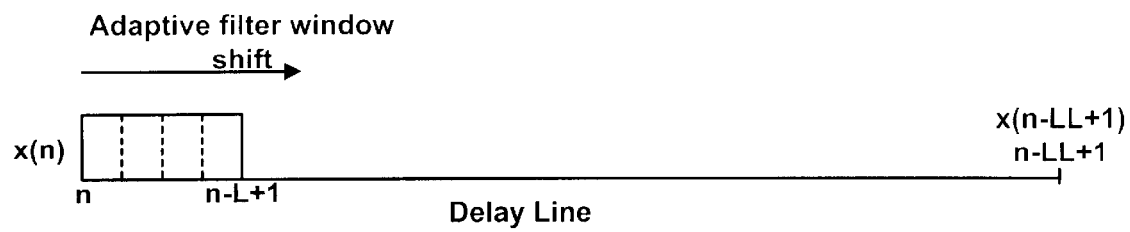
FIGS. 9A, 9B, 9C and 9D are block diagrams illustrating shifting of an adaptive filter according to an exemplary embodiment.

FIG. 9A, FIG. 9B, FIG. 9C and FIG. 9D illustrate an adaptive filter shifting according to an exemplary embodiment. As shown in FIG. 9A an adaptive filter window having a length L is divided in four sub-windows, where each sub-window length is M. Thus, at the beginning of the implementation, the adaptive filter window covers samples from a current sample to the latest L−1 (L−4M), where a length of L is substantially equal to the length of a major body of an echo path. After L+N−M iterations (where N>M) of the adaptive filtering algorithm, the level detector 490 searches for the maximum absolute coefficient at the very left block of M adaptive filter coefficients (the coefficients of a first sub-window). Further, the position detector 470 determines a position of the maximum absolute coefficient value, and the level comparator 480 compares the maximum absolute coefficient value with a predetermined threshold level.

According to an exemplary embodiment, the threshold level is a sum of the ERL and a predetermined constant level. In one embodiment, the level comparator 480 compares a maximum coefficient dB level with a predetermined dB threshold level. If the maximum coefficient level is greater then the threshold level (the sum of the ERL and the constant, both expressed in dB) then, the block of the coefficients determined during the iteration process for the portion of the echo path is used to cancel the echo. However, if the maximum coefficient level is lower than or equal to the predetermined threshold level, a pure delay of the echo path is detected, and the sub-window associated with that coefficient is discarded. According to an exemplary embodiment, if the maximum coefficient level is lower than or equal to the predetermined threshold level, a new sub-window is added to the end of the filter window. Thus, the action of discarding the sub-window and adding a new sub-window at the end of the adaptive filter window is equivalent to shifting the adaptive filter window by a length of one sub-window.

Figure 9B:
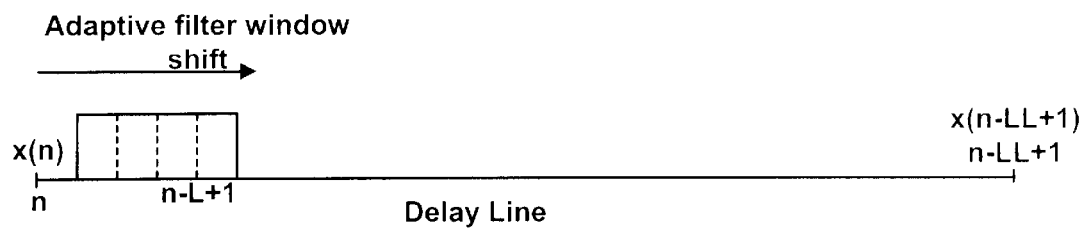

FIG. 9B shows the position of the adaptive filter window after shifting the filter window by one sub-window length. When the filter window is shifted, the adaptive filtering algorithm is continuously performed. After N (N>M) iterations, the procedure described in reference to FIGS. 9A and 9B is repeated until the major body of the echo path is detected.

Figure 9C:
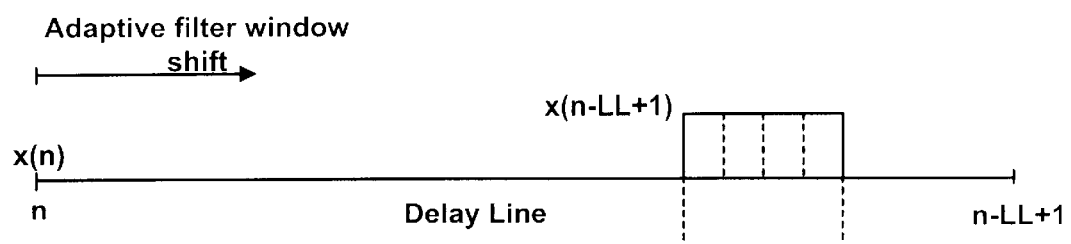
Figure 9D:
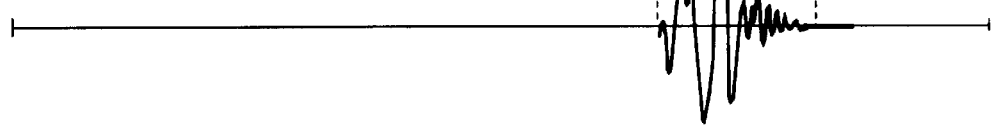

FIG. 9C shows the position of the adaptive filter window, where the adaptive filter window matches the major body of the impulse response as shown in FIG. 9D. If the maximum to coefficient level in the first sub-window is greater than the threshold level, and the maximum coefficient is located in the most left position of the first sub-window, the adaptive filter window is shifted to the left by about a half sub-window length in order to ensure that the entire echo major body is covered. The reason for shifting the adaptive filter window slightly to the left is that there could be some small peaks at the left of the detected major peak. In this way, the adaptive filter window covers the entire major body of the impulse response associated with the echo path. Once the adaptive filter window substantially covers the major body of the impulse response, the adaptive filter window quickly converges to the major body of the impulse response after some iterations of the adaptive filter algorithm, and the echo is cancelled.

From the implementation addressed in reference to FIGS. 9A, 9B, 9C and 9D, it is clear that the robustness of the adaptive filter algorithm depends on a number of iterations N. However, the choice of N is a tradeoff between the robustness and convergence rate. When N is small, the adaptive filtering algorithm may not converge well and, therefore, a peak value in the sub-window may be far away from its true value, resulting in a misdetection. For example, if a true peak value in a first sub-window of the adaptive filter window is greater than the predetermined threshold level, and a small N value is used, an adapted peak value may be lower than the predetermined threshold level. Thus, in such an embodiment, the filter window would shift resulting in the misdetection. On the contrary, when N is larger, the peak covered in the adaptive filter sub-window converges more robustly and, thus, the robustness of the adaptive filtering algorithm increases. However, a larger N implies a longer time that is spent for detecting delay and, thus, results in a lower convergence rate. Therefore, the choice of N is a tradeoff between the robustness and convergence, and depending on design requirements, the value of N can be determined employing one of the existing or later developed simulation techniques. However, in general, N is greater than or equal to M. Further, the highest convergence is achieved when N=M, and when N=M, the time that is spent for updating the coefficients is short. In general, the coefficients of the adaptive filter in a decision sub-window are updated from L+N−M times to L+N times. Therefore, the robustness depends on the adaptive filter window size L, and if L is larger, then, N can be smaller.

FIG. 10 is a flow chart illustrating an exemplary method 500 for an echo cancellation and detection of varying pure delay. At step 502, a filter coefficient vector of an adaptive filter that models the echo channel characteristics is updated. Preferably, the filter coefficient vector is updated according to a normalized least mean square algorithm. Further, the adaptive filter window has a length L, where the length L corresponds to a length of a major body of the echo path. Further, the adaptive filter window has a plurality of sub-windows, and each sub-window has a length M. For example, the adaptive filter window is divided into four sub-windows, and in such an embodiment, the adaptive filter length L=4M.

At step 504, filter coefficients in a first sub-window of the adaptive filter window are analyzed. Preferably, analyzing the filter coefficients includes analyzing the filter coefficient vector after each update of the filter coefficient vector in step 502. Further, according to an exemplary embodiment, the first sub-window corresponds to a very left block of M adaptive filter coefficients.

At step 506, a coefficient having the largest magnitude in the first sub-window is determined. Preferably, determining the largest magnitude of the coefficient in the first sub-window includes determining a sequence of indices, and further, determining an index corresponding to the location of the filter coefficient having the largest magnitude.

At step 508, the largest magnitude coefficient is compared with a predetermined threshold level, where the predetermined threshold level is a sum of the ERL and a predetermined constant level. According to an exemplary embodiment, the comparison step includes determining whether the maximum magnitude coefficient is greater than the predetermined threshold level. If the largest magnitude coefficient is less than or equal to the predetermined threshold level, a pure delay is detected, and the adaptation filter window is shifted one sub-window length toward the major body of the echo, as shown at step 514. Once the adaptation filter window is shifted, the method 500 continues at step 502, and the steps 502, 504, 506, 508 and 514 are repeated until a largest magnitude coefficient in the first sub-window is greater than the predetermined threshold level.

Referring back to block 508, if the largest magnitude coefficient in the first sub-window is larger than the predetermined threshold level, a major body is detected, and after some iterations of the adaptive filter algorithm, the adaptive filter converges to the major body of the impulse response. In one embodiment, if a position of the largest magnitude coefficient is in a very left position of the first sub-window, it is possible that there are some small peaks at the left of the detected major peak. In such an embodiment, the adaptive filter window is shifted a half sub-window length to the left to make sure that the adaptive filter window covers the entire major body of the impulse response. Further, once the adaptive filter window is shifted, the adaptive filter window converges to the major body of the echo path.

At step 512, a far end signal echo is adaptively filtered using the adaptive filter to create a local replica of a far end signal echo to cancel the far end signal echo.

It should be understood that any or all of the steps of the embodiments of the method 500 can be implemented via digital signal processing that performs the same or similar function or to functions as the steps on a digital signal processor.

According to the described method 500, the pure delay of the echo path is detected, and the echo introduced by the major body of the echo path is cancelled simultaneously. Thus, according to an exemplary embodiment, the convergence rate is increased and the steady state residual error is reduced. Therefore, according to an exemplary embodiment, the implementation cost is reduced by reducing the MIPS and memory required by the echo cancellation process. According to the exemplary embodiment, the pure delay is detected by identifying the major peak position in the impulse response, and once the pure delay is fully detected and the adaptive filter covers the major body of the impulse response, the adaptive filter algorithm converges. However, even though the position detection is quite robustness just by using an adaptive filter algorithm, there could be a small error associated with the filter coefficients in the adaptive filter window. In fact, the error associated with the filter coefficients could be larger when coefficients not covered by the adaptive filter window are large or when a local signal is large.

As known in the art, if x(n) is a far end signal and s(i) is an echo path impulse response, then, echo y(n) can be represented according to:

$$y(n) = \sum_{i=0}^{LL-1} s(i)x(n-i), \qquad (1)$$

where LL is an echo path length or an echo path impulse response length. Further, if an adaptive filter at time n is $h_n(i)$ for i=0, 1, 2, . . . , LL−1, then, an estimated echo at time n is a convolution of the far end signal with the adaptive filter and can be represented according to:

$$\hat{y}(n) = \sum_{i=0}^{LL-1} h_n(i)x(n-i) \qquad (2)$$

As known in the art, a residual echo e(r) is defined as a true echo minus the estimated echo and can be represented according to:

$$e(n) = y(n) - \hat{y}(n) = \sum_{i=0}^{LL-1} s(i)x(n-i) - \sum_{i=0}^{LL-1} h_n(i)x(n-i) \quad (3)$$

Further, according to the NLMS adaptive filtering algorithm, the adaptive filter coefficients are updated according to:

$$h_{n+1}(i) = h_n(i) + 2\,\mu(n)e(n)x(n-i) \quad (4)$$

where $\mu(n) = \mu/E[|x(n)|^2]$ and where $\mu$ is a constant and $E[\ ]$ is an expectation. As known in the art, if the echo cancellation converges, an adaptive filter converges to an optimal filter H that minimizes $E[|e(n)|^2]$ according to:

$$H = R^{-1}P \quad (5)$$

where $$R(i,j) = E[x(n-i)x(n-j)^*] \quad (6)$$

is an auto-correlation matrix of x(n), and $$p(j) = E[y(n)x(n-j)^*] \quad (7)$$

is a cross correlation.

According to an exemplary embodiment, if the echo path is LL and the major body length is L, then, the adaptive filter window is L. According to Eq. 7:

$$\begin{aligned}
p(i) &= E[y(n)x(n-i)^*] = E\left[\sum_{j=0}^{LL-1} s(j)x(n-j)x(n-i)^*\right] \\
&= E\left[\sum_{j=0}^{L-1} s(j)x(n-j)x(n-i)^*\right] + E\left[\sum_{j=L}^{LL-1} s(j)x(n-j)x(n-i)^*\right] \\
&= \sum_{j=0}^{L-1} s(j)E[x(n-j)x(n-i)^*] + \sum_{j=L}^{LL-1} s(j)E[x(n-j)x(n-i)^*] \\
&= \sum_{j=0}^{L-1} s(j)R(i,j) + \sum_{j=L}^{LL-1} s(j)R(i,j) = \sum_{j=0}^{L-1} s(j)R(i,j) + \sum_{j=0}^{LL-L-1} s(j+L)R(i,j+L)
\end{aligned} \quad (8)$$

where R(i,j) are the auto-correlation functions. If $S = [S_1\ S_2]^T$ with $S_1 = [S_0, S_1, \ldots, S_{L-1}]^T$, $S_2 = [S_L, S_{L+1}, \ldots, S_{LL-1}]^T$, $R(i,j) = E[x(n-i)^*x(n-j)]$ with $0 \leq i < L$, $0 \leq j < L$, and $R_1 = \{R(i,j+L), 0 \leq i < L, 0 \leq j < LL-L\}$, then $$P = RS_1 + R_1 S_2 \quad (9)$$

where $S_1$ is the echo path coefficients covered by an adaptive filter window and $S_2$ is the echo path coefficients not covered by the adaptive filter window. According to (5), the optimal adaptive filter is:

$$h^o = R^{-1}P = S_1 + R^{-1}R_1 S_2 \quad (10)$$

Thus, according to Eq. 10, the optimal adaptive filter has an error as shown in a second term of Eq. 10. If the adaptive filter window covers the whole major body after it is shifted a few times, as described in greater detail in reference to FIG. 9, then, $S_2$ is a vector where all elements are zero, and an optimal peak is equal to a true peak. Thus, if the adaptive filter window covers the entire major body, the peak of the adaptive filter converges to the true peak after some iteration times. In such an embodiment, the delay may be detected and adjusted, and the adaptive filter may quickly converge to the major body.

However, if the adaptive filter window does not cover the entire major body of the echo path, i.e. some elements in $S_2$ are non-zero, the coefficient values in the adaptive filter window will change even if the window covers only the pure delay. If an optimal adaptive filter is $S_1$, then, the second term in Eq. 10 is the error contributed to the adaptive filter window, and the error depends on R, $R_1$, and $S_2$. Thus, the error depends on the input signal property and the major body not covered by the adaptive filter window.

According to statistic theory, if the input signal is a white noise process, then $R_1$ is a zero matrix. In such an embodiment, the second term is Eq. 10 is a zero vector and, thus, for a white noise input, a peak position covered in the adaptive filter window can be robustly detected. However, if the input signal is a speech signal, then, $R_1$ is not a zero matrix, and an error exists as shown according to Eq. 10. To reduce the error, prior to applying the sub-window technique described in the proceeding paragraphs, a whitening process may be applied to the input speech signals so that non-diagonal elements in matrix R and all elements in $R_1$ are small. According to an exemplary embodiment, the whitening process can be implemented according to one of the existing or later developed whitening processes. In one embodiment, the whitening process can be accomplished using a pre-emphasis technique, where a filter having a transfer function $1-az^{-1}$ is applied to the input signal, and where a is 0.9, for example. However, the value of a is not limited to 0.9, and the value of a could also be determined using a one step prediction method commonly known in the art.

Further, as known in the art, the auto-correlation is smaller when a difference between i and j+L is large. According to Eq. 9, $R_1 = \{R(i,j+L), 0 \leq i < L, 0 \leq j < LL-L\}$, and a minimum difference between between i and j+L is 1. Therefore, some elements in $R_1$ may be larger than some coefficients. However, according to the exemplary embodiment, the process of detecting a peak associated with the major body of the echo path is not applied across the entire adaptive filter window, but it is applied to the first sub-window only. Thus, the filter coefficients are only detected from 0 to M−1 in the adaptive filter window. Such an embodiment corresponds to $0 \leq i < M$ in $R_1 = \{R(i,j+L), 0 \leq i < L, 0 < j < LL-L\}$, and a resulting error is L−M. Thus, the resulting error caused by the second term in Eq. 10 associated with the coefficients 0 to M−1 is small.

An operating environment for the described embodiments includes a processing system with at least one high speed Central Processing Unit ("CPU") or other processing unit and a memory system. In accordance with the practices of persons skilled in the art of computer programming, the described embodiments with reference to acts and symbolic representations of operations or instructions that are performed by the processing system, unless indicated otherwise. Such acts and operations or instructions are sometimes referred to as being computer-executed, or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system. In particular, the methods and any embodiments thereof can be executed by a processing unit in response to, or responsively to, instructions stored in or on a computer readable medium.

In view of many embodiments to which the principles of the invention may be applied, it should be understood that the illustrated embodiments are exemplary embodiments and should not limit the present invention as defined by the claims. Further, unless specified to the contrary, the steps of the flow charts may be taken in sequence other than those described, and more, fewer or equivalent elements or components could also be used.

What is claimed:

1. In an echo canceller, a method for canceling an echo channel characteristics, the method comprising:
    receiving a far end signal with an echo, the echo having a major body portion and a pure delay portion;
    providing a filter of a finite length covering a portion of the echo path, wherein the filter comprises a plurality of subwindows;
    determining whether at least a of the body of the echo is within the filter; and
    shifting the filter by a sub-window length if the at least a portion of the major body of the echo path is not within the filter; and
    repeating the steps of determining whether the at least a portion of the major body is within the filter and shifting the filter by the sub-window length until the at least a portion of the major body of the echo path is within the filter.

2. A computer readable medium having stored therein instructions for causing a central processing unit to execute the method of claim 1.

3. The method as claimed in claim 1, wherein the filter comprises a plurality of sub-windows, and wherein the step of determining whether the portion of the major body of the echo path is within the filter comprises determining whether the at least a portion of the major body of the echo path is within a first sub-window of the filter.

4. The method as claimed in claim 3, wherein the step of determining whether at least the portion of the major body of the echo path is within the filter comprises:
    analyzing a filter coefficient vector in the first sub-window;
    determining a maximum absolute coefficient value in the first sub-window; and
    determining whether the maximum absolute coefficient value in the first sub-window is greater than a threshold level.

5. The method as claimed in claim 4, further comprising the step of determining a position of the maximum absolute coefficient in the first sub-window.

6. The method as claimed in claim 5, wherein the step of determining the position of the maximum absolute coefficient comprises determining a sequence of indices in the first sub-window and an index value of the maximum absolute coefficient.

7. The method as claimed in claim 1, further comprising the step of:
    updating a filter coefficient vector in the filter upon receipt of the far end signal; and
    using the filter coefficient vector to cancel the echo channel characteristics if the major body of the echo is within the filter.

8. The method as claimed in claim 1, wherein the step of shifting the filter comprises shifting the filter at least one sub-window length toward the major body of the echo.

9. The method as claimed in claim 1, wherein the finite length of the filter is substantially equal to a length of the major body.

10. The method as claimed in claim 1, further comprising the step of applying a whitening process to the far end signal upon receipt of the far end signal if the far end signal is a speech signal.

11. The method as claimed in claim 10, wherein the step of applying the whitening process to the far end signal comprises applying a filter having a transfer function $1-az^{-1}$ to the far end signal, wherein a is determined using a one step prediction process.

12. In an echo canceller, a method for canceling an echo channel characteristics, the method comprising:
    receiving a far end signal;
    updating a filter coefficient vector in an adaptive filter window, the adaptive filter window having a length substantially equal to a major body of an echo path, the adaptive filter window covering a segment of the echo path, and wherein the adaptive filter comprises a plurality of subwindows;
    determining whether the adaptive filter window covers the major body of the echo path using filter coefficient in a first sub-window of the adaptive filter window; and
    shifting the adaptive filter window at least a sub-window length toward the echo path if the adaptive filter window does not cover the major body of the echo path; and
    repeating the steps of determining whether the at least a portion of the major body is within the filter and shifting the filter by the sub-window length until the at least a portion of the major body of the echo path is within the filter.

13. A computer readable medium having stored therein instructions for causing a processing unit to execute the method of claim 12.

14. The method as claimed in claim 12, wherein the filter coefficient vector is updated according to a normalized least mean square algorithm.

15. The method as claimed in claim 12, wherein the step of determining whether the adaptive filter covers the major body of the echo path comprises:
    analyzing a filter coefficient vector in the first sub-window;
    determining a maximum absolute coefficient value in the first sub-window; and
    determining whether the maximum absolute coefficient value in the first sub-window is greater than a threshold level.

16. The method as claimed in claim 15, further comprising the step of determining a position of the maximum absolute coefficient in the first sub-window.

17. The method as claimed in claim 16, wherein the step of determining the position of the maximum absolute coefficient in the first sub-window comprises determining a sequence of indices and an index value associated with the maximum absolute coefficient.

18. The method as claimed in claim 12, further comprising the step of filtering the far end signal using the filter coefficient vector to cancel the echo channel characteristics of the far end signal if the adaptive filter window covers the major body of the echo path.

19. The method as claimed in claim 12, further comprising the step of updating the filter coefficient vector upon the shifting the filter window toward the major body of the echo path.

20. The method as claimed in claim 12, wherein the filter coefficient vector is updated according to a normalized least mean square algorithm.

21. The method as claimed in claim 12, further comprising the step of applying a whitening process to the far end signal prior to the updating the filter coefficient vector if the far end signal is a speech signal.

22. The method as claimed in claim 21, wherein the step of applying the whitening process to the far end signal comprises applying a filter to the far end signal.

23. The method as claimed in claim 22, wherein the filter comprises a filter having a transfer function $1-az^{-1}$, wherein a is determined using a one step prediction process.

24. The method as claimed in claim 23, wherein a is 0.9.

25. In an echo canceller, a method for canceling an echo channel characteristic, the method comprising the steps of:
    detecting a far end signal with an echo;
    updating a filter coefficient vector in an adaptive filter window having a length substantially equal to a major body of an echo path, the adaptive filter window covering a segment of the echo path, and wherein the adaptive filter comprises a plurality of subwindows;
    determining a maximum absolute coefficient value in a first sub-window of the adaptive filter window;
    determining whether the maximum absolute coefficient value in the first sub-window is greater than a threshold level; and
    shifting the adaptive filter window by a sub-window length toward the major body of the echo path if the maximum absolute coefficient value in the first subwindow is not greater than the threshold level; and
    repeating the steps of determining whether the maximum absolute coefficient value in a sub-window is greater than a threshold level and shifting the filter until the at least a portion of the major body of the echo path is within the filter.

26. The method as claimed in claim 25, further comprising, using the filter coefficient vector to cancel echo characteristics if the maximum absolute coefficient value is greater than the threshold level.

27. The method as claimed in claim 25, further comprising: determining whether the far end signal is a speech signal; and
    applying a whitening process to the far end signal prior to the updating the filter coefficient vector in the adaptive filter window if the far end signal is the speech signal.

28. An echo canceller for canceling echo path characteristics, the echo canceller comprising:
    an adaptive filter having a finite length and a plurality of subwindows;
    a level detector for determining a maximum filter coefficient of the adaptive filter;
    a level comparator for determining whether at least a portion of the major body of the echo path is within the adaptive filter using the maximum filter coefficient; and
    a shifter for shifting the adaptive filter by a sub-window length if the at least a portion of the major body of the echo path is not within the adaptive filter; and
    means for repeating (i) the determination of whether at least a portion of the major body of the echo path is within the adaptive filter and (ii) the shifting of the adaptive filter, until the at least a portion of the major body of the echo path is within the adaptive filter.

29. The echo canceller as claimed in claim 28, wherein the adaptive filer is substantially equal to a major body portion of an echo path.

30. The echo canceller as claimed in claim 28, wherein the level detector determines the maximum filter coefficient in a first subwindow of the adaptive filter.

31. The echo canceller as claimed in claim 30, wherein the level comparator compares the maximum filter coefficient with a predetermined threshold value in the first sub window of the adaptive filter.

32. In an echo canceller, a method for canceling an echo channel characteristics, the method comprising:
    receiving a far end signal with an echo, the echo having a major body portion and a pure delay portion;
    providing a filter of a finite length covering a portion of the echo path;
    determining whether at least a portion of the major body of the echo is within the filter;
    shifting the filter if the at least a portion of the major body of the echo path is not within the filter; and
    applying a whitening process to the far end signal upon receipt of the far end signal if the far end signal is a speech signal, wherein the step of applying the whitening process to the far end signal comprises applying a filter having a transfer function $1-az^{-1}$ to the far end signal, wherein a is determined using a one step prediction process.

33. In an echo canceller, a method for canceling an echo channel characteristics, the method comprising:
    receiving a far end signal;
    updating a filter coefficient vector in an adaptive filter window, the adaptive filter window having a length substantially equal to a major body of an echo path, the adaptive filter window covering a segment of the echo path;
    determining whether the adaptive filter window covers the major body of the echo path using filter coefficient in a first sub-window of the adaptive filter window;
    shifting the adaptive filter window at least a sub-window length toward the echo path if the adaptive filter window does not cover the major body of the echo path; and
    applying a whitening process to the far end signal prior to the updating the filter coefficient vector if the far end signal is a speech signal, wherein the step of applying the whitening process to the far end signal comprises applying a filter to the far end signal and wherein the filter has a transfer function $1-az^{-1}$, wherein a is determined using a one step prediction process.

34. The method as claimed in claim 33 wherein a is 0.9.

* * * * *